Dec. 25, 1945. M. ALTIMUS 2,391,610
SAFETY LOCKING LEVER FOR COUPLING PINS
Filed April 27, 1944
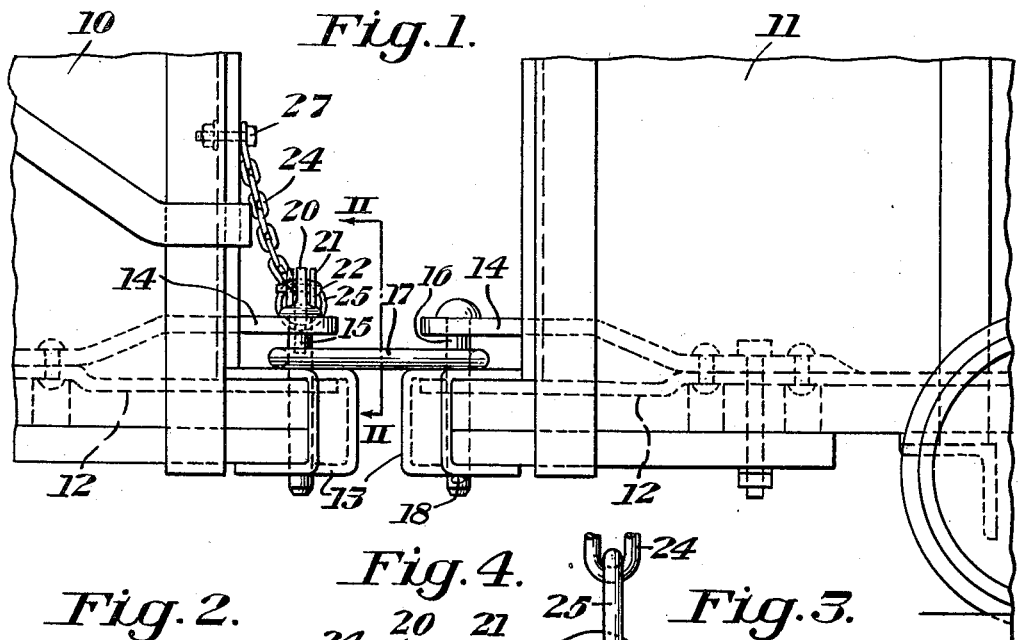
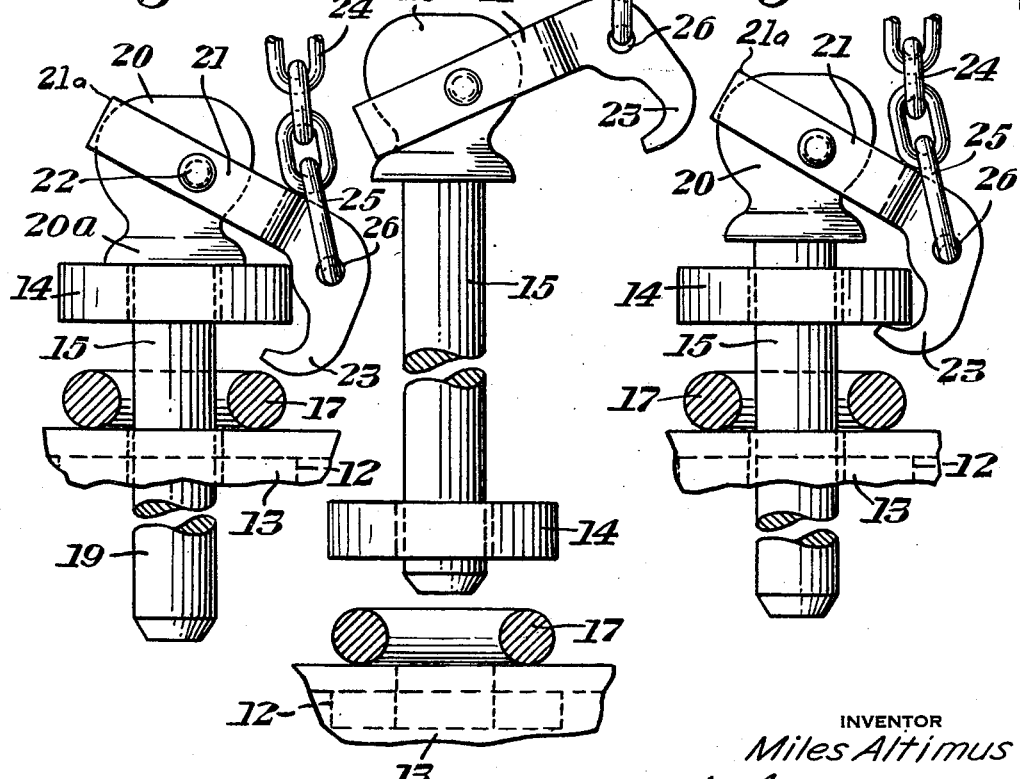
INVENTOR
Miles Altimus
by his attorneys
Stebbins, Blenko & Webb Patented Dec. 25, 1945

2,391,610

UNITED STATES PATENT OFFICE 2,391,610

SAFETY LOCKING LEVER FOR COUPLING PINS

Miles Altimus, Nanty Glo, Pa., assignor to Irwin Foundry & Mine Car Company, Irwin, Pa., a corporation of Pennsylvania Application April 27, 1944, Serial No. 533,089

1 Claim. (Cl. 213—188)

This invention relates to a coupling for wheeled vehicles and, in particular, to a pin and link coupling of the type used extensively for industrial cars, such as mine cars.

It has been proposed heretofore to provide coupling pins adapted to be inserted through the drawbar of a car and the link connecting it to the adjacent car, with a safety locking lever adapted to engage the edge of the drawbar and thereby prevent the pin from working itself upwardly to such an extent as to permit accidental uncoupling of the cars. My invention is an improvement on the previously known locking lever, whereby the disengagement of the lever and the withdrawal of the coupling pin may be effected by a single manual operation which can readily be performed with one hand, instead of requiring both hands, as is necessary in the case of known construction. With the latter, it is usually necessary to raise the lever with one hand and pull out the pin with the other.

In a preferred embodiment of the invention, I provide a coupling pin having a locking lever pivoted thereto, with a lift chain attached to the lever at a point spaced from the pivotal connection between the lever and pin whereby, upon an upward pull on the chain, the lever is first raised to clear the drawbar and the pin is then pulled out. The lever has a rearwardly projecting tail end which limits movement of the lever by engaging the pin. The end of the chain opposite that attached to the locking lever is preferably secured to the car body so as to be readily accessible for hand operation.

A complete understanding of the invention may be had from the following detailed description and explanation which refer to the accompanying drawing illustrating the preferred embodiment. In the drawing, Figure 1 is a partial side elevation of the adjacent ends of two cars coupled together, utilizing a coupling pin according to the invention;

Figure 2 is a view to enlarged scale, largely in end elevation but partly in section along the plane of line II—II of Figure 1, showing the pin and locking lever in one position, the end wall of the car being omitted;

Figure 3 is a view similar to Figure 2 showing the pin and lever in partly upraised position resulting from the tendency of the pin to work itself upwardly under the vibration, shock, tilting and twisting of one car relative to another in traveling along the rails; and, Figure 4 is a similar view showing the relation of the locking lever and the coupling pin when an upward pull is exerted on the chain to withdraw the pin.

Referring now in detail to the drawing, cars 10 and 11 may be of any suitable type. The usual construction of industrial cars of the type shown includes a frame composed of structural members, a bottom and side and end walls of wood or metal sheathing. The car wheels are usually journaled on axles secured directly to the car bottom. In the construction illustrated, the cars have drawbars 12 extending outwardly over bumpers 13 beyond the end walls. Auxiliary drawbars 14 are secured to the drawbars 12 with their outer ends thereof spaced above the outer ends of the latter. Aligned holes in the drawbars 12 and 14 are adapted to receive coupling pins 15 and 16. A coupling link 17 has its ends disposed between the spaced ends of the main and auxiliary drawbars 12 and 14 so that the pins 15 and 16 pass through the link. The pin 15 is the removable pin which is withdrawn to uncouple the cars. The pin 16 is a fixed pin which is held in place by cotter pin 18. It will be understood that each car has a removable pin 15 at one end and a fixed pin 16 at the other.

The pin 15 has a shank 19 and a flattened head 20 with a flange 20a therebelow. A locking lever 21 is pivoted to the head 20 by means of a rivet 22 or the like. As shown in Figure 1, the lever 21 is bifurcated at the end which is pivoted to the head 20, the latter being received within the spaced portions of the lever. The bifurcated ends of the lever 21a extend a substantial distance beyond the rivet for a purpose which will be explained later. The end of the lever 21 remote from the head 20 is formed into a hook-shaped portion 23 adapted to engage the underside of the drawbar 14 should the pin tend to work itself upwardly as a result of vibration or tilting or twisting of the cars relative to each other. Figure 2 shows the normal position of the lever when the pin is in its lowermost position with the flange 20a bottomed on the drawbar 14. Figure 3 illustrates the action of the lever 21 in limiting upward movement of the pin under the various forces applied to it in operating a train of cars over the rails.

A lift chain 24 is attached to the lever 21 at a point spaced from the rivet 22. The chain is preferably connected to the lever adjacent the hook portion 23. A ring 25 may conveniently be inserted through a hole 26 in the lever and through the last link in the chain, before being welded. The other end of the chain is secured to a convenient point on the end wall of the car by a bolt 27.

The locking lever 21 functions in the known manner, as above explained, to prevent the pin 15 from working itself out of the drawbar. When it is desired to withdraw the pin 15 for the purpose of uncoupling the cars, it is only necessary to apply an upward pull to the chain 24. This can easily be done with one hand. An upward pull on the chain 24 first tilts the lever 21 from the position of Figure 2 to that shown in Figure 4, with the tail end 21a of the lever 21 engaging the flange 20a and preventing further angular movement of the lever. By this tilting movement, the hook portion 23 of the lever clears the drawbar 14. Thereafter the upward pull on the chain is effective to withdraw the pin to complete the uncoupling operation. It will thus be apparent that the movement of the locking lever from the operative or holding position to the inoperative or clear position results automatically from the upward pull on the chain which is the natural operation for anyone attempting to perform the uncoupling. When recoupling, the pin is merely dropped into place after properly positioning the connecting link 17. The locking lever automatically falls to the position shown in Figure 2 when the pin has been inserted and the chain 24 released.

It will be recognized from the foregoing that the invention provides a coupling pin having an important advantage over the pins with locking levers as heretofore constructed. The improvement does not introduce any additional complication into the construction nor does it increase the manufacturing cost. Since the tilting of the locking lever to inoperative position results automatically from the upward pull on the chain and is arrested at the proper point, it is unnecessary to give any special instructions regarding the operation of the improved form of pin. The ability to disengage the locking lever and pull out the pin as a single operation performed by one hand is of great advantage from the standpoint of the ease and speed of uncoupling.

The extended tail end 21a of the lever 21 also prevents it from accidentally falling over backward into a position in which the lever would not be effective to hold the pin in place.

Although I have illustrated and described but a preferred embodiment of the invention, it will be appreciated that changes in the design and arrangement of the parts may be made within the spirit of the invention and the scope of the appended claim.

I claim:

In a safety lock for a car-coupling pin, a lever pivoted to the head of the pin, said lever having one end adapted to engage under a member secured to the car, and a tail end projecting beyond the pivot adapted to engage the pin and prevent further angular movement of the lever after sufficient tilting thereof to cause said one end to clear said member, said one end of the lever being of hook shape and said tail end being bifurcated and straddling the head of the pin.

MILES ALTIMUS.